United States Patent [19]

Saur

[11] Patent Number: 4,550,693
[45] Date of Patent: Nov. 5, 1985

[54] TEMPERATURE CONTROL ARRANGEMENT FOR COMBUSTION ENGINE

[75] Inventor: Roland Saur, Stuttgart, Fed. Rep. of Germany

[73] Assignee: Behr-Thomson Dehnstoffregler GmbH, Kornwestheim, Fed. Rep. of Germany

[21] Appl. No.: 640,964

[22] Filed: Aug. 15, 1984

[30] Foreign Application Priority Data

Sep. 9, 1983 [DE] Fed. Rep. of Germany ....... 3332587

[51] Int. Cl.$^4$ .............................................. F01P 7/16
[52] U.S. Cl. .................................. 123/41.1; 236/34.5
[58] Field of Search ................ 123/41.08, 41.09, 41.1; 236/34, 34.5, 101 R, 101 C, 51

[56] References Cited

U.S. PATENT DOCUMENTS

| | | | |
|---|---|---|---|
| 2,377,028 | 5/1945 | Nicholas | 236/34.5 |
| 2,833,478 | 5/1958 | Middleton | 236/34 |
| 4,164,322 | 8/1979 | Wong et al. | 236/34.5 |
| 4,175,696 | 11/1979 | Braukmann | 236/34.5 |

FOREIGN PATENT DOCUMENTS 695730  8/1953  Fed. Rep. of Germany .

*Primary Examiner*—William A. Cuchlinski, Jr.
*Attorney, Agent, or Firm*—Barnes & Thornburg

[57] ABSTRACT

An arrangement is provided for controlling the coolant temperature in a coolant circulating system of an internal-combustion engine, such as in a motor vehicle, containing a thermostatic valve that controls the coolant flow from the internal-combustion engine through a direct return flow means and/or through a heat exchanger back to the internal-combustion engine, and containing a thermostatic working element having a housing carrying a valve disk of a valve controlling coolant flow to the heat exchanger, and having a working piston extendable under heat and being supported at a counterbearing. The working piston and the counterbearing form an adjusting mechanism, and a control element is connected to the working piston or the counterbearing which forces the working piston into an adjusted position.

14 Claims, 3 Drawing Figures

TEMPERATURE CONTROL ARRANGEMENT FOR COMBUSTION ENGINE

BACKGROUND AND SUMMARY OF THE INVENTION

The present invention relates generally to an apparatus for controlling the temperature in a coolant circulating system of an internal-combustion engine, such as a motor vehicle engine, of the type containing a thermostatic valve that controls the coolant flow from the internal-combustion engine through a direct return flow line and/or through a heat exchanger back to the internal-combustion engine. More particularly, the present invention relates to thermostatic controls responsive to coolant and motor temperatures as well as external parameters, such as the temperature of the outside environment.

It has long been known to use thermostatic valves for controlling the coolant or cooling water temperature of an internal-combustion engine. These thermostatic valves are adjusted in such a way that, as the engine is started at a certain temperature below the optimum operating temperature, the coolant flow connection to the heat exchanger is opened up only after a predetermined temperature is achieved by the coolant. Until this predetermined temperature is achieved, coolant flow into the engine is only through the direct return flow line. The object of these arrangements is for the internal-combustion engine to be heated or warmed-up to its optimum operating temperature in as short a time as is possible.

The outside environment temperature has considerable influence on the engine warming-up time. In the case of a high outside temperature, the optimum operating temperature of the internal-combustion engine will be reached far faster than in the case of a lower outside temperature. A thermostatic valve that opens at a coolant temperature that is too far below the optimum operating temperature delays achievement of the optimum operating temperature of the internal combustion engine, especially in the case of low outside temperatures. For low outside temperatures, it is therefore desirable that the thermostatic valve open at a higher coolent temperature that is closer to the optimum operating temperature. However, in the case of high outside temperatures, it is desirable that the thermostatic valve open at a clearly lower coolant temperature so that, subsequently, the optimum operating temperature of the engine will not be exceeded.

In prior practice, the selection of a single opening temperature of the thermostatic valve has represented a compromise which, as much as possible, must take into account all outside temperatures. In the manufacturing plant this opening temperature is typically adjusted via a counterbearing which is then secured in the adjusted position. For example, the device shown in German Published Unexamined Application (DE-OS) 25 32 057 provides a valve having a working piston with an external threaded portion and screwed into a nut serving as a counterbearing. This nut is kept stationary in a strap. After adjusting the nut to provide the desired opening temperature, the nut is secured in that position on the threaded portion by, for example, a counternut or calking of the thread. Once so screwed, the thermostatic valve is not responsive to variations in the outside temperature.

However, in practice it has been found to be desirable to construct a thermostatic valve in such a way that it is responsive to variations in outside temperatures, i.e., that in the case of low outside temperatures it opens at a higher coolant temperature than in the case of high outside temperatures. In an attempt to achieve this, it has been suggested that so-called thermostatic winter valves be installed for low outside temperatures, and so-called thermostatic summer valves be installed for higher outside temperatures. However, this results in an additional maintenance procedure and, especially when the thermostatic valve is not selected correctly, in the danger of damaging the engine.

In order to provide a thermostatic valve responsive to outside temperatures it has also be suggested to employ a single valve device that can be adjusted to the respective existing outside temperature. However, none of the previously known devices of this type have been used in practice since they are all special constructions that deviate from the proven constructions for thermostatic valves, require high manufacturing expenditures and also do not offer sufficient operational reliability. For example, the device shown in German Published Unexamined Application (DE-OS) 14 51 669 provides two thermostatic working elements which are to be used individually or, alternatively, successively. The relative position of these two thermostatic working elements is changed individually or jointly with respect to the valve disk, requiring relative motion between the thermostatic working element and the valve disk. In addition to requiring high cost expenditures, this device presents the problem that a slideway must be provided between the valve disk and the thermostatic working elements, such a slideway is very susceptible to interferences and is located where it is difficult to ensure tightness over an extended operating period.

U.S. Pat. application Ser. No. 510,192, filed on July 1, 1983, now U.S. Pat. No. 4,522,334 and assigned to the assigner of the present invention, provides a device wherein the position of the abutment stop can be changed in such a way that it forms different support points for the working piston so that the distance to the valve plate housing can be adjusted. This device does not require any basic change of the valve construction that has proven itself in practice. In addition, it is possible, by means of this device, to not only carry out a control that is dependent on the outside temperature but also to use other control variables in order to adjust the operating temperature of the engine, such as the exhaust gas temperature, the speed and/or the torque of the engine, the vacuum in the suction pipe, the pressure difference at a vacuum cell, the oil temperature, or similar variables. While this arrangement has been successful in many applications, it is desirable to provide a faster and less expensive control means.

It is therefore an object of the present invention to provide an improved thermostatic valve having valve characteristics responsive to changes in external parameters and a reduced cost of assembly and maintenance.

Another object is to provide a thermostatic valve for use in coolant circulating systems of internal-combustion engines which is quickly responsive to control parameters.

A further object is the provision of a simplified and efficient thermostatic valve assembly for rendering thermostatic valves responsive to external parameters.

These and other objects of the present invention are achieved by the provision of a thermostatic valve containing a thermostatic working element having a housing supporting a valve disk and a working piston extending and being supported at a counterbearing such that the working piston and counterbearing form an adjusting mechanism. A control element is provided in connection with the working piston or the counterbearing which forces the working piston into an adjusted position. This thermostatic valve is arranged in the coolant circulating system of an internal combustion engine to control the coolant flow from the internal combustion engine through a direct return flow line and/or through a heat exchanger back to the internal combustion engine. The valve disk supported on the working element housing forms a portion of a valve controlling fluid flow to the heat exchanger.

The present invention provides all the advantages of simplicity and responsiveness to external parameters of the invention described in U.S. Pat. application Ser. No. 510,192. However, the manufacturing expenditures are significantly decreased by forming the adjusting mechanism from the working piston and the counterbearing, and the working piston is positively forced into its adjusted position without having to follow the independently adjusted counterbearing. The working piston thus performs an additional function, namely, it is itself a component of the adjusting mechanism.

A further embodiment of the present invention that the working piston includes an external thread and is screwed into the counterbearing, provided with a corresponding internal thread, and that a control element having a rotating drive is connected to the working piston or to the counterbearing. The adjusting mechanism therefore consists only of the working piston and the counterbearing, in which case, the control element is applied directly to one of the two parts. Constructional expenditures therefore are relatively low.

In one embodiment of this, the working piston is connected with the coupling element via a coupling means transmitting the drive rotations and the counterbearing is stationary. In this case, a threaded borehole of a connecting sleeve is provided to be used as the counterbearing. In another of such embodiments, the working piston is held in a means securing it against twisting, and the counterbearing is formed as a nut that is driven by the control element and secured in axial direction. In a further of such embodiments, the working piston has an axial toothing which engages a pinion that also serves as a counterbearing. This pinion is connected to the control element.

In many embodiments of the present invention, small electric motors such as direct current motors or stepping motors, may be provided as the control elements by means of which intermediate positions of the working piston may be adjusted. Alternatively, hydraulic or pneumatic operating control elements may be employed.

In still another embodiment of the present invention, a connecting sleeve with the thermostatic valve, the counterbearing and the control element form a single structural unit. It is thus possible to test the operability of the whole arrangement before mounting into the motor vehicle in the manufacturing plant and to adjust it to the range of the desired opening temperature. This arrangement will then be installed as a structural unit into the coolant circulating system of an internal combustion engine.

Further objects, features, and advantages of the present invention will become more apparent from the following description when taken with the accompanying drawings which show, for purposes of illustration only, embodiments in accordance with the present invention.

DETAILED DESCRIPTION OF THE DRAWINGS

Figure 1:
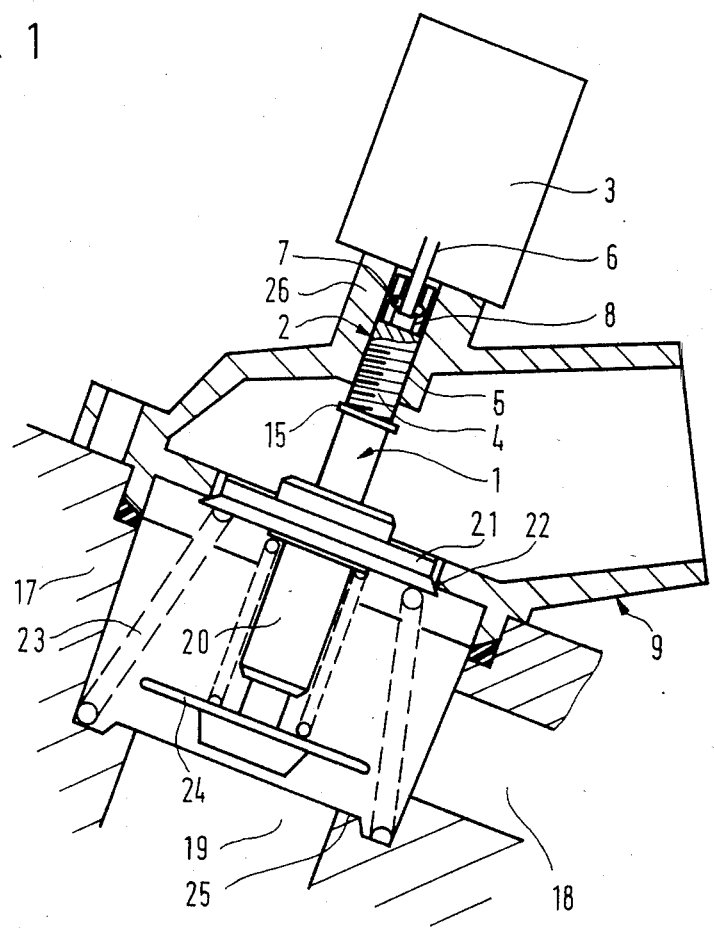
FIG. 1 is a schematic part sectional view which shows a cross section through a temperature control apparatus constructed in accordance with the principles of the present invention.

FIG. 1, which illustrates a preferred embodiment of the present invention, shows a temperature control apparatus having a housing 17 with an inlet 18 for receiving coolant coming from the internal combustion engine (not shown), direct return flow line 19 for permitting coolant flow back to the internal combustion engine, and connecting sleeve 9 for permitting coolant flow to a heat exchanger (not shown). Another fluid flow line (not shown) leads further from the heat exchanger back to the internal combustion engine. A thermostatic valve is provided in housing 17 to guide and control the connection of coolant fluid from inlet 18 to either or both of direct return flow line 19 and connecting sleeve 9.

The thermostatic valve includes a thermostatic working element having a piston housing 20 and an expanding material within piston housing 20 that expands when it is heated to drive a working piston 1 out of piston housing 20 along a generally longitudinal axis. During cooling, the expanding material reduces its volume again so that working piston 1 can be pressed back into piston housing 20. This piston housing includes a valve 21 firmly connected thereto. The conical edge of valve disk 21 is engageable with a valve seat 22 formed on connecting sleeve 9. The valve formed by valve disk 21 and valve seat 22 closes or opens the fluid connection between inlet 18 and connecting sleeve 9 leading to the heating exchanger. Valve disk 21 is loaded by a pressure spring 23 and is biased into its closed position with respect to connecting sleeve 9. Pressure spring 23 supports itself on an internal projection of housing 17. However, the present invention also contemplates that a spring plate can be mounted at connection sleeve 9 by means of straps by which pressure spring 23 will support itself.

On the area of housing 20 that is opposite valve disk 21, another valve disk 24 is arranged in a slideway. Valve disk 24 serves to control fluid flow to direct return flow line 19. Valve disk 24 is engageable with a valve seat 25 of housing 17 that surrounds direct return flow line 19.

At its extreme end, working piston 1 is provided with an external thread 4, by means of which it is screwed into a threaded borehole 5 of connecting sleeve 9. This threaded borehole forms a counterbearing 2. Control element 3 is fastened at a projection 26 of connecting sleeve 9 by means of a spindle 6 that can be rotatably driven. Control element 3 is coupled with working piston 1 by means of a cross pin 7 in spindle 6 that is guided in an axial slot guiding device 8 of working piston 1 so that a coupling is created that transmits the rotating movement. Control element 3, in a manner that is not shown in detail, is connected to a control means which, as a function of a selectable control variable, can forcibly adjust the axial position of working piston 1 with respect to threaded borehole 5. This control variable may, for example, be a function of the outside temperature or also a function of the exhaust gas temperature, of the speed and/or the torque of the internal-combustion engine, the vacuum pressure in the suction pipe, the pressure difference at a vacuum cell or the oil temperature or similar variables. By adjusting the axial position of working piston 1, the operating temperature of the engine can be changed within certain limits so that the operation of the internal-combustion engine can be optimized according to one or several criteria.

When the internal-combustion engine is started and the coolant starts to circulate, the thermostatic valve is in the position shown in FIG. 1, i.e., the connection from inlet 18 to connecting sleeve 9 and thus to the heat exchanger is closed, while the connection from inlet 18 to direct return flow line 19 is open. In this case, the coolant flows around housing 20 of the thermostatic working element. The expanding material contained in housing 20 is advantageously designed in such a way that, at a certain temperature range near the opening temperature of the thermostatic valve, it enlarges or reduces its volume as linearly as possible with respect to rising or falling temperatures, respectively. The volume that is first available to the expanding material within housing 20 is determined by the axial position of working piston 1. When it has filled this volume by its temperature-dependent expansion, any further enlargement of its volume is connected with a corresponding linear extension of working piston 1 from housing 20. Since the axial position of working piston 1 is then defined, any further enlargement of the volume of the expanding material results in a relative shifting of piston housing 20, with valve disk 21, thereon against the biasing force pressure spring 23. In this way, the valve formed by valve disk 21 and valve disk 22 is opened. At the same time, with the extension of working piston 1 and the connected axial shifting of piston housing 20, valve disk 24 moves to engage valve seat 25 so that the valve associated with direct return flow line 19 is closed.

The above description illustrates that the axial position of working piston 1 determines the valve characteristics, i.e., the opening of the valve formed by valve disk 21 and valve disk 22 leading to the heat exchanger and the closing of the valve formed by valve disk 24 and valve seat 25 leading to the direct return flowline 19. By adjusting the axial position of working piston 1, the valve position can therefore be changed irrespective of the temperature of the coolant coming in via inlet 18. Thus, by corresponding adjustment of working piston 1, via control element 3, the engine operating temperature can be adjusted within certain limits by changing the valve position to achieve an optimum level. This also results in the adjustment of the opening temperature of the valve formed by valve disk 21 and valve seat 22. The adjusting mechanism required for this purpose is influenced by motion of spindle 6 of control element 3 and is formed directly by working piston 1 and by counterbearing 2, which is developed as a stationary threaded borehole 5. It has been found to be advantageous to secure the final or extreme positions of working piston 1 by stops. For this purpose, working piston 1, as shown in FIG. 1, is provided with a stop ring 15.

Figure 2:
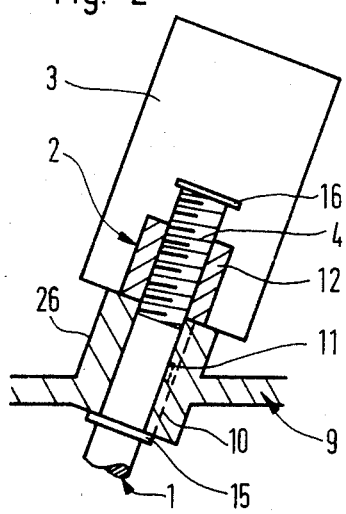
FIG. 2 is a partial sectional view of a temperature control apparatus employing another embodiment of the present invention.

FIG. 2 shows another embodiment of the present invention wherein the construction of the thermostatic valve in principle corresponds to that of the embodiment of FIG. 1. Working piston 1' is also provided with an external thread 4' at an end portion on which a nut 12, arranged outside connecting sleeve 9', is screwed. Nut 12 serves in this embodiment as counterbearing 2'. Nut 12 is secured in the axial direction and can be rotatably driven by control element 3'. The axial position of working piston 1' is forcibly adjusted by means of these rotations. The end positions of working piston 1' are limited by stop rings 15' and 16'. In this embodiment, working piston 1' must be secured against twisting. This is provided by guiding working piston 1' with a radial cam 11 in an axial recess 10 of projection 26' of connecting sleeve 9'.

Figure 3:
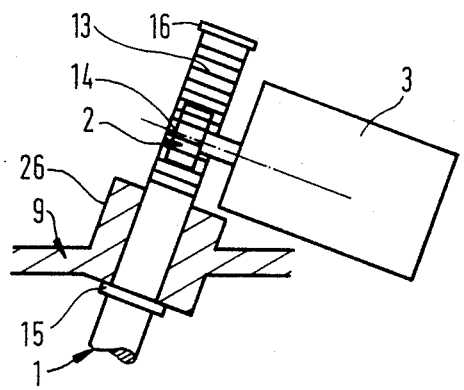
FIG. 3 is a partial sectional view of a temperature control apparatus employing still another embodiment of the present invention.

FIG. 3 shows yet another embodiment of the present invention wherein the construction of the thermostatic valve generally corresponds to the embodiment of FIG. 1. The end of working piston 1" led out of connecting sleeve 9" is provided with a rack-type toothing 13 engageable with a pinion 14 driven by control element 3". Pinion 14 is used as counterbearing 2" for working piston 1". The end positions of working piston 1" are secured by stop rings 15" and 16".

The present invention also contemplates, as a type of reversal of the embodiment of FIG. 3, that the adjusting drive for the working piston can be provided by means of a control element that is a linear motor with a toothed rack that engages with a pinion mounted on working piston to cause axial adjustment of the working piston. Nut 12 of FIG. 2 could, for example, be formed as such a pinion so that the axial adjustment is caused by the rotation of nut 12, as in the case of FIG. 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is

1. An arrangement for controlling the temperature in a coolant circulating system of an internal-combustion engine of a motor vehicle, which includes a thermostatic valve means for controlling the coolant flow from said internal-combustion engine through a direct return flow line and through a heat exchanger back to said internal-combustion engine, a thermostatic working element having a housing supporting a valve disk for controlling coolant flow leading to said heat exchanger, and a working piston extending under heat relative to said thermostatic working element and being, supported at a counterbearing, said working piston and said counterbearing forming an adjusting mechanism, and control means, connected to said working piston or said counterbearing, for forcing said working piston into an adjusted position selectively to delay or accelerate actuation of the thermostatic working element.

2. The arrangement according to claim 1, wherein said working piston, by means of an external thread, is screwed into said counterbearing, being provided with a corresponding internal thread, and wherein said control means includes a rotating drive connected to said adjusting mechanism.

3. The arrangement according to claim 2, wherein said working piston is connected with said control means via a coupling transmitting the rotation of said rotating drive and wherein said counterbearing is stationary.

4. The arrangement according to claim 3, wherein a threaded borehole of a connecting sleeve providing coolant flow to said heat exchanger is employed as said counterbearing.

5. The arrangement according to claim 2, wherein said working piston is secured in a means for preventing twisting of said working piston, and wherein said counterbearing includes a nut that is driven by said control means and is secured in the axial direction.

6. The arrangement according to claim 1, wherein at least one of the possible end positions of said working piston are limited by stops.

7. The arrangement according to claim 1, wherein a connecting sleeve for providing coolant flow to said heat exchanger is formed as a single structural unit with said thermostatic valve counterbearing and control means.

8. The arrangement according to claim 1, wherein said control means is connected directly to said counterbearing.

9. The arrangement according to claim 1, wherein said thermostatic valve means also controls coolant flow through said direct return flow means to said internal combustion engine.

10. An arrangement for controlling the temperature in a coolant circulating system of an internal-combustion engine of a motor vehicle, comprising:
inlet means for providing coolant flow from said internal combustion engine, direct return flow means for providing coolant flow to said internal-combustion engine, heat exchanger means for receiving said coolant, thermostatic valve means for controlling coolant flow through said heat exchanger means from said inlet means, a thermostatic working element having a housing carrying a valve disk of said thermostatic valve means and having a working piston, extendable relative to said working element in response to temperature and supported at a counterbearing, said working piston and said counterbearing forming an adjusting mechanism, and control means for forcing said working piston into an adjusted position selectively to delay or accelerate extension of the thermostatic working element, the control means being connected to said adjusting mechanism.

11. An apparatus for thermostatically controlling the temperature of coolant fluid circulating in a motor comprising:
inlet means for receiving coolant flow from said motor;
direct return means for providing coolant flow to said motor;
connecting sleeve means for providing coolant flow to heat exchanger means;
thermostatic valve means for selectively communicating said inlet means with said direct return means and with said connecting sleeve means, including valve disk means for controlling coolant flow through said direct return means and connecting sleeve means, and thermostatic working element means for actuating said valve disk means;
counterbearing means for supporting the thermostatic working element means, and
adjustment means for altering the actuation of said thermostatic working element means in response to external parameters, including control means for moving said thermostatic working element means relative to the counterbearing means.

12. The arrangement according to claim 11, wherein said thermostatic working element includes a temperature responsive working piston supported within a piston housing having said valve disk means mounted thereon.

13. The arrangement according to claim 12, wherein said working piston is threadably engaged with said counterbearing means and said control means causes relative rotation between said working piston and said counterbearing means.

14. An arrangement for controlling the temperature in a coolant circulating system of an internal-combustion engine of a motor vehicle, which includes a thermostatic valve means for controlling the coolant flow from said internal-combustion engine through a direct return flow line and through a heat exchanger back to said internal-combustion engine, a thermostatic working element having a housing supporting a valve disk for controlling coolant flow leading to said heat exchanger, and a working piston extending under heat relative to said working element and being supported at a counterbearing, said working piston and said counterbearing forming an adjusting mechanism, and a control means for forcing said working piston into an adjusted position, connected to said working piston or said counterbearing, wherein said working piston is provided with an axial toothing into which a pinion engages that is formed as said counterbearing, said piston being connected to said control means.

* * * * *